US008842687B1

(12) United States Patent
Jackson et al.

(10) Patent No.: US 8,842,687 B1
(45) Date of Patent: Sep. 23, 2014

(54) BY-PASS PORT FACILITATING NETWORK DEVICE FAILURE DETECTION IN WIDE AREA NETWORK TOPOLOGIES (75) Inventors: Simon Adrian Jackson, Crowthorne (GB); Hogan Lew, Sunnyvale, CA (US)

(73) Assignee: Blue Coat Systems, Inc., Sunnyvale, CA (US)

(*) Notice: Subject to any disclaimer, the term of this patent is extended or adjusted under 35 U.S.C. 154(b) by 1144 days.

(21) Appl. No.: 11/479,949

(22) Filed: Jun. 30, 2006

(51) Int. Cl.
H04L 12/28 (2006.01)

(52) U.S. Cl.
USPC .......................................................... 370/419

(58) Field of Classification Search
None
See application file for complete search history.

(56) References Cited

U.S. PATENT DOCUMENTS

| | | | | |
|---|---|---|---|---|
| 5,987,526 | A * | 11/1999 | Morales ........................ | 709/249 |
| 6,249,510 | B1 * | 6/2001 | Thompson ..................... | 370/223 |
| 6,327,242 | B1 | 12/2001 | Amicangioli et al. | |
| 6,560,227 | B1 * | 5/2003 | Bartoldus et al. ............. | 370/390 |
| 6,781,994 | B1 * | 8/2004 | Nogami et al. ............ | 370/395.1 |
| 7,035,204 | B1 * | 4/2006 | Bortolotto et al. ............ | 370/218 |
| 7,180,854 | B2 * | 2/2007 | Cambron ...................... | 370/227 |
| 7,245,583 | B1 * | 7/2007 | Renucci ........................ | 370/217 |
| 7,283,551 | B1 * | 10/2007 | Algie ............................ | 370/442 |
| 7,447,228 | B1 * | 11/2008 | Algie ............................ | 370/433 |
| 2001/0056490 | A1 * | 12/2001 | Nagami et al. ................ | 709/227 |
| 2002/0114286 | A1 * | 8/2002 | Iwamura et al. .............. | 370/252 |
| 2002/0146004 | A1 * | 10/2002 | Perkinson et al. ............ | 370/389 |
| 2003/0219025 | A1 * | 11/2003 | Choi et al. .................... | 370/401 |
| 2003/0223466 | A1 * | 12/2003 | Noronha et al. .............. | 370/537 |
| 2004/0078620 | A1 * | 4/2004 | Harel et al. ........................ | 714/4 |
| 2004/0141470 | A1 * | 7/2004 | Kelcourse et al. ............ | 370/282 |
| 2004/0162992 | A1 * | 8/2004 | Sami et al. ..................... | 713/200 |
| 2005/0083917 | A1 * | 4/2005 | Okamoto et al. ............. | 370/352 |
| 2006/0047851 | A1 * | 3/2006 | Voit et al. ...................... | 709/239 |
| 2006/0173581 | A1 * | 8/2006 | Elkayam et al. .............. | 700/286 |
| 2006/0245422 | A1 * | 11/2006 | Willhite et al. ............... | 370/359 |
| 2007/0025240 | A1 * | 2/2007 | Snide ............................ | 370/217 |
| 2007/0041365 | A1 * | 2/2007 | Nejah ........................... | 370/352 |
| 2007/0058529 | A1 * | 3/2007 | Valdes et al. .................. | 370/225 |
| 2007/0061056 | A1 * | 3/2007 | Valsorda ......................... | 701/20 |

* cited by examiner

*Primary Examiner* — Faruk Hamza
*Assistant Examiner* — Andrew Oh
(74) *Attorney, Agent, or Firm* — Baker Botts L.L.P.

(57) ABSTRACT

An exemplary embodiment provides for methods, apparatuses and systems to facilitate the detection of network device failures in a variety of network topologies. This is accomplished by equipping a network device, or other devices used in conjunction with network devices, with a bypass port or network interface, such as a secondary outgoing network traffic communication port. In a normal operating mode, network traffic received at a first network interface or port is forwarded, after processing on the packet processing path of the network device, from a second network interface or port. In one implementation, the second network interface or port and the bypass port or network interface are connected to corresponding interfaces of a router or two routers. When a network device failure occurs network traffic bypasses the packet processing path of the network device and is forwarded from the bypass port or interface.

6 Claims, 7 Drawing Sheets

BY-PASS PORT FACILITATING NETWORK DEVICE FAILURE DETECTION IN WIDE AREA NETWORK TOPOLOGIES

CROSS-REFERENCE TO RELATED APPLICATIONS

This application makes reference to the following commonly owned U.S. patent applications, which are herein incorporated in their entirety for all purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment without Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at Network, Transport and Application Layers in Store and Forward Network;"

U.S. patent application Ser. No. 09/198,090 now U.S. Pat. No. 6,412,000, in the name of Guy Riddle and Robert L. Packer, entitled "Method for Automatically Classifying Traffic in a Packet Communications Network;"

U.S. patent application Ser. No. 09/198,051, in the name of Guy Riddle, entitled "Method for Automatically Determining a Traffic Policy in a Packet Communications Network;"

U.S. patent application Ser. No. 09/206,772, now U.S. Pat. No. 6,456,360, in the name of Robert L. Packer, Brett D. Galloway and Ted Thi, entitled "Method for Data Rate Control for Heterogeneous or Peer Internetworking;"

U.S. patent application Ser. No. 09/710,442, in the name of Todd Krautkremer and Guy Riddle, entitled "Application Service Level Mediation and Method of Using the Same;"

U.S. patent application Ser. No. 09/966,538, in the name of Guy Riddle, entitled "Dynamic Partitioning of Network Resources;"

U.S. patent application Ser. No. 10/015,826 in the name of Guy Riddle, entitled "Dynamic Tunnel Probing in a Communications Network;"

U.S. patent application Ser. No. 10/039,992, in the name of Michael J. Quinn and Mary L. Laier, entitled "Method and Apparatus for Fast Lookup of Related Classification Entities in a Tree-Ordered Classification Hierarchy;"

U.S. patent application Ser. No. 10/108,085, in the name of Wei-Lung Lai, Jon Eric Okholm, and Michael J. Quinn, entitled "Output Scheduling Data Structure Facilitating Hierarchical Network Resource Allocation Scheme;"

U.S. patent application Ser. No. 10/178,617, in the name of Robert E. Purvy, entitled "Methods, Apparatuses and Systems Facilitating Analysis of Network Device Performance;"

U.S. patent application Ser. No. 10/155,936 now U.S. Pat. No. 6,591,299, in the name of Guy Riddle, Robert L. Packer, and Mark Hill, entitled "Method For Automatically Classifying Traffic With Enhanced Hierarchy In A Packet Communications Network;"

U.S. patent application Ser. No. 10/236,149, in the name of Brett Galloway and George Powers, entitled "Classification Data Structure enabling Multi-Dimensional Network Traffic Classification and Control Schemes;"

U.S. patent application Ser. No. 10/334,467, in the name of Mark Hill, entitled "Methods, Apparatuses and Systems Facilitating Analysis of the Performance of Network Traffic Classification Configurations;"

U.S. patent application Ser. No. 10/453,345, in the name of Scott Hankins, Michael R. Morford, and Michael J. Quinn, entitled "Flow-Based Packet Capture;"

U.S. patent application Ser. No. 10/676,383 in the name of Guy Riddle, entitled "Enhanced Flow Data Records Including Traffic Type Data;"

U.S. patent application Ser. No. 10/720,329, in the name of Weng-Chin Yung, Mark Hill and Anne Cesa Klein, entitled "Heuristic Behavior Pattern Matching of Data Flows in Enhanced Network Traffic Classification;"

U.S. patent application Ser. No. 10/812,198 in the name of Michael Robert Morford and Robert E. Purvy, entitled "Adaptive, Application-Aware Selection of Differentiated Network Services;"

U.S. patent application Ser. No. 10/843,185 in the name of Guy Riddle, Curtis Vance Bradford and Maddie Cheng, entitled "Packet Load Shedding;"

U.S. patent application Ser. No. 10/858,340 in the name of Roopesh R. Varier, James J. Stabile, Paul Leslie Archard, Guy Riddle and David Jacobsen, entitled "Network Traffic Synchronization and Data Compression in Redundant Network Topologies;"

U.S. patent application Ser. No. 10/938,435 in the name of Guy Riddle, entitled "Classification and Management of Network Traffic Based on Attributes Orthogonal to Explicit Packet Attributes;" and U.S. patent application Ser. No. 11/027,744 in the name of Mark Urban, entitled "Adaptive Correlation of Service Level Agreement and Network Application Performance."

BACKGROUND

Enterprises have become increasingly dependent on computer network infrastructures to provide services and accomplish mission-critical tasks. Indeed, the performance, security, and efficiency of these network infrastructures have become critical as enterprises increase their reliance on distributed computing environments and wide area computer networks. To that end, a variety of network devices have been created to provide data gathering, reporting, and/or operational functions, such as firewalls, gateways, packet capture devices, bandwidth management devices, application traffic monitoring devices, and the like. For example, the TCP/IP protocol suite, which is widely implemented throughout the world-wide data communications network environment called the Internet and many wide and local area networks, omits any explicit supervisory function over the rate of data transport over the various devices that comprise the network. While there are certain perceived advantages, this characteristic has the consequence of juxtaposing very high-speed packets and very low-speed packets in potential conflict and produces certain inefficiencies. Certain loading conditions degrade performance of networked applications and can even cause instabilities which could lead to overloads that could stop data transfer temporarily.

To facilitate monitoring, management and control of network environments, a variety of network devices, applications, technologies and services have been developed. For example, certain data flow rate control mechanisms have been developed to provide a means to control and optimize efficiency of data transfer as well as allocate available bandwidth among a variety of business enterprise functionalities. For example, U.S. Pat. No. 6,038,216 discloses a method for explicit data rate control in a packet-based network environment without data rate supervision. Data rate control directly moderates the rate of data transmission from a sending host, resulting in just-in-time data transmission to control inbound traffic and buffering of packets, and reduce the inefficiencies associated with dropped packets. Bandwidth management devices also allow for explicit data rate control for flows associated with a particular traffic classification. For example, U.S. Pat. No. 6,412,000, above, discloses automatic classification of network traffic for use in connection with bandwidth allocation mechanisms. U.S. Pat. No. 6,046,980 discloses systems and methods allowing for application layer control of bandwidth utilization in packet-based computer networks. For example, bandwidth management devices allow network administrators to specify policies operative to control and/or prioritize the bandwidth allocated to individual data flows according to traffic classifications. In addition, certain bandwidth management devices, as well as certain routers, allow network administrators to specify aggregate bandwidth utilization controls to divide available bandwidth into partitions. With some network devices, these partitions can be configured to provide a minimum bandwidth guarantee, and/or cap bandwidth, as to a particular class of traffic. An administrator specifies a traffic class (such as FTP data, or data flows involving a specific user or network application) and the size of the reserved virtual link—i.e., minimum guaranteed bandwidth and/or maximum bandwidth. Such partitions can be applied on a per-application basis (protecting and/or capping bandwidth for all traffic associated with an application) or a per-user basis (controlling, prioritizing, protecting and/or capping bandwidth for a particular user). In addition, certain bandwidth management devices allow administrators to define a partition hierarchy by configuring one or more partitions dividing a network path and further dividing the parent partitions into one or more child partitions. U.S. patent application Ser. No. 10/108,085 discloses data structures and methods for implementing a partition hierarchy.

Certain application traffic management devices, such as the PacketShaper® application traffic management device, offered by Packeteer®, Inc. of Cupertino, Calif., support the concurrent use of aggregate bandwidth policies (e.g., partitions), and per-flow bandwidth policies, such as rate policies enforced by the TCP Rate control technologies disclosed in U.S. Pat. No. 6,038,216. A partition is essentially a bandwidth allocation and queuing mechanism. That is, after a packet processor classifies each packet and pushes each packet onto a partition queue associated with the appropriate partition, another process, typically, loops through the partition queues to pop packets off the queues and populate an output queue. Aggregate bandwidth allocation among the different partitions essentially establishes a preference by which a flow control mechanism arbitrates among the corresponding partition queues. For example, a flow control module, while arbitrating among the partition queues, may read more packets from partitions having a higher allocation of bandwidth relative to partitions that have lower allocations. For example, as disclosed in U.S. application Ser. No. 10/108,085, incorporated by reference above, the bandwidth allocated to a given partition affects the rate at which the partition is selected by an output scheduling process and therefore the length of time packets are buffered in the corresponding partition queue. In addition, TCP Rate Control technologies can be used to affect per-flow rate policies to control or influence the rate at which packets are received at a network device and, therefore, use of inbound network bandwidth and the amount of data that is queued at any given time.

The Transmission Control Protocol (TCP) provides connection-oriented services for the protocol suite's application layer—that is, the client and the server must establish a connection to exchange data. TCP transmits data in segments embodied in IP datagrams, along with checksums, used to detect data corruption, and sequence numbers to ensure an ordered byte stream. TCP is considered to be a reliable transport mechanism because it requires the receiving host to acknowledge not only the receipt of data but also its completeness and sequence. If the sending host does not receive notification from the receiving host within an expected time frame, the sending host times out and retransmits the segment.

TCP uses a sliding window flow-control mechanism to control the throughput over wide-area networks. As the receiving host acknowledges initial receipt of data, it advertises how much data it can handle, called its window size. The sending host can transmit multiple packets, up to the advertised window size, before it stops and waits for an acknowledgment. The sending host transmits data packets up to the advertised window size, waits for acknowledgement of the data packets, and transmits additional data packets.

TCP's congestion-avoidance mechanisms attempt to alleviate the problem of abundant packets filling up router queues. TCP's slow-start algorithm attempts to take full advantage of network capacity. TCP increases a connection's transmission rate using the slow-start algorithm until it senses a problem and then it backs off. It interprets dropped packets and/or timeouts as signs of congestion. The goal of TCP is for individual connections to burst on demand to use all available bandwidth, while at the same time reacting conservatively to inferred problems in order to alleviate congestion. Specifically, while TCP flow control is typically handled by the receiving host, the slow-start algorithm uses a congestion window, which is a flow-control mechanism managed by the sending host. With TCP slow-start, when a connection opens, only one packet is sent until an ACK is received. For each received ACK, the sending host doubles the transmission size, within bounds of the window size advertised by the receiving host. Note that this algorithm introduces an exponential growth rate. The TCP transmitter increases a connection's transmission rate using the slow-start algorithm until it senses a problem and then it backs off. It interprets dropped packets and/or timeouts as signs of congestion. Once TCP infers congestion, it decreases bandwidth allocation rates.

Application traffic management devices are often deployed at the edges of enterprise networks to control bandwidth utilization, for example, across an access link to a wide area network (WAN). Such network devices typically include one or more inside or LAN ports, and one or more outside or WAN ports. When the traffic management device is situated at that single gateway between one and other networks, it will logically be able to process all inbound and outbound traffic. As a result, the device can effectively classify flows and maintain rate control policies on specific partitions.

However, application traffic management devices can sometimes become non-functional due to Typically, a bypass switch is utilized to shunt network traffic away from a packet processing section of the non-functioning application traffic management device in order to maintain network connectivity. Restated, upon the failure of a network device, a short circuit is created between the inside or LAN port and the outside or WAN port to allow electrical signals carrying network traffic to bypass the processing path of the network device. Such functionality is sometimes referred to as "fail-to-wire." U.S. Pat. No. 6,327,242, for example, discloses one possible fail-to-wire implementation. While network connectivity may be maintained during a device failure, it is sometimes difficult to know when the network device has actually failed as network connectivity has been maintained. This situation is further compounded when the device is deployed remotely and physical inspection of the device is not easily available and/or a system operator can not remotely access the device in general.

In view of the foregoing, it may be beneficial to provide methods, apparatuses and systems to facilitate detection of failures of network devices in a wide area network topology.

The foregoing examples of the related art and limitations related therewith are intended to be illustrative and not exclusive. Other limitations of the related art will become apparent to those of skill in the art upon a reading of the specification and a study of the drawings.

SUMMARY

An embodiment by way of non-limiting example provides for methods, apparatuses and systems to facilitate the detection of network device failures in a variety of network topologies. This is accomplished by equipping a network device, or other devices used in conjunction with network devices, with a bypass port or network interface, such as a secondary outgoing network traffic communication port. In a normal operating mode, network traffic received at a first network interface or port is forwarded, after processing on the packet processing path of the network device, from a second network interface or port. In one implementation, the second network interface or port and the bypass port or network interface are connected to corresponding interfaces of a router or two routers. When a network device failure occurs, in one implementation, network traffic bypasses the packet processing path of the network device and is forwarded from the bypass port or interface. As discussed in more detail below, in one implementation, a closed circuit is created between the first port or interface and the bypass port interface to by-pass the packet processing path. In another implementation, an optical switch is configured, upon detection of a network device failure, to forward optical signals to a bypass port. In either implementation, by appropriately configuring another network device, such as a router, to which the bypass port or interface is connected, failures of the network device can be detected. For example, a network device failure can be detected by configuring a WAN router to which the bypass port or interface is connected to transmit a trap or other alert if network traffic is received on the corresponding interface.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be considered illustrative rather than limiting.

DETAILED DESCRIPTION

The following embodiments and aspects thereof are described and illustrated in conjunction with systems, apparatuses and methods which are meant to be exemplary and illustrative, not limiting in scope.

Figure 1:
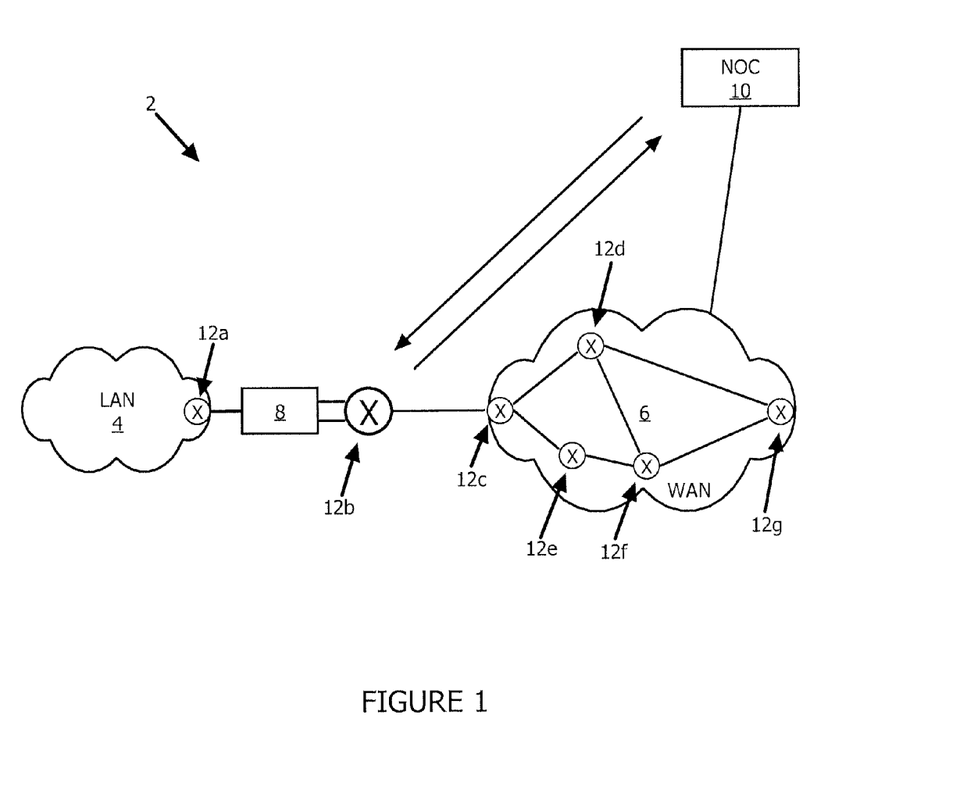
FIG. 1 is a functional block diagram illustrating a wide-area network topology for detecting a network device failure, in accordance with an exemplary embodiment.

FIG. 1 is a functional block diagram illustrating a wide-area network topology 2 for detecting a network device failure, in accordance with an exemplary embodiment. Included in topology 2 is a local area network ("LAN") 4, a wide area network ("WAN") 6, a network device 8, a network operations center ("NOC") 10 and various routers 12. Network device 8 is situated to process network traffic transmitted between LAN 4 and WAN 6, such as classifying network traffic and applying bandwidth utilization controls. Network device 8 is additionally configured with an additional bypass network traffic communication port (see FIG. 2). As previously mentioned, this bypass port is utilized when the network device 8 experiences a failure condition. Network traffic that is normally processed by network device 8 is bypassed away from a processing section of device 8 and the outgoing communication port (not shown) that is used for processed network traffic. Restated, incoming network traffic enters the network device 8 utilizing an incoming network traffic port (not shown) and then leaves the network device via the additional port when the device becomes non-functional. As FIG. 1 illustrates, network device 8 is operably connected to router 12b via two separate communication lines—that is, the normal outside port of network device is operably attached to a first network interface of router 12b, while a bypass port of network device 8 is operably connected to a second network interface of router 12b. In another implementation, the bypass port of network device 8 can be connected to a network interface of a second router.

As described below, under normal operating conditions, network traffic received from LAN 4 at network device 8 is forwarded from the normal outside port and is, therefore, encountered at the first network interface of router 12b. However, upon the failure of network device 8, network traffic from LAN 4 bypasses the packet processing path of network device 8, and is encountered at the second network interface of router 12b. A network management protocol, such as simple network management protocol ("SNMP"), can be utilized to monitor network traffic conditions at the second network interface of router 12b. When network traffic appears at the second network interface, an alert (such as an SNMP trap) can be sent to a system operator local to the device 8 or, perhaps, a system operator at a remote location such as NOC 10.

In the event of a network device failure, network traffic can be diverted from the processing section of the network device 8 and regular outgoing communication port via a number of implementations such as a software-controlled switch and an optical switch module used in conjunction with the network device 8. These various implementations are described in subsequent sections.

Figure 2:
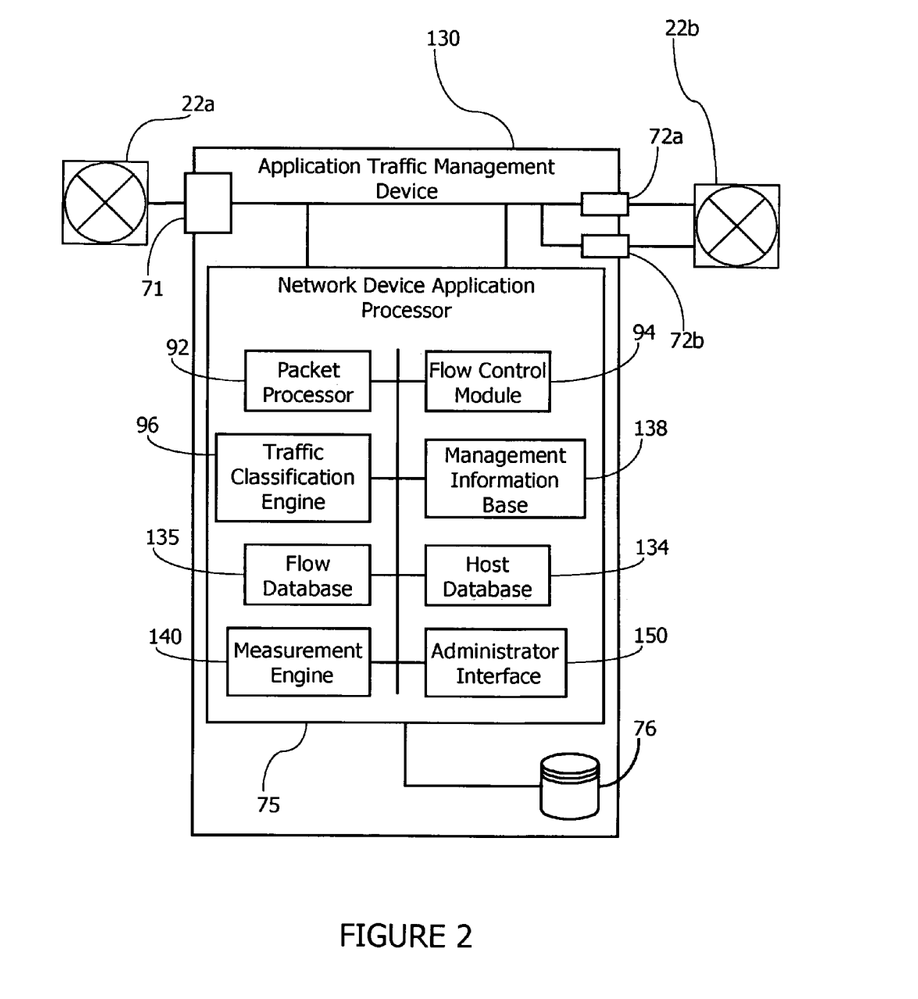
FIG. 2 is a functional block diagram illustrating the functionality of a network application traffic management device, in accordance with an exemplary embodiment.

Before the claimed embodiments are further detailed, FIGS. 2-3 will first be described in order to convey an environment in which those claimed embodiments may operate. As FIG. 2 illustrates, network device 130 may be an application traffic management device deployed at the edge of an autonomous system or network. Network device 130 is merely exemplary and other devices can be used to practice the claimed embodiments. As discussed more fully below, application traffic management device 130 is operative to classify and manage data flows traversing a network path to which the device is operably connected. In one implementation, application traffic management device 130 also includes functionality operative to monitor the performance of the network (such as network latency) and/or network applications.

As FIG. 2 illustrates, network application traffic management device 130, in one implementation, comprises network device application processor 75, a first network interface 71, a second network interfaces 72a and a third bypass network interface 72b, which operably connect application traffic management device 130 to routers 22a and 22b. Of course, application traffic management device 130 can include additional network interfaces. Network device application processor 75 generally refers to the functionality implemented by application traffic management device 130, such as network monitoring or reporting, application traffic management, and the like. In one embodiment, network device application processor 75 is a combination of hardware and software, such as a central processing unit, memory, a system bus, an operating system, device drivers, and one or more software modules implementing the functions performed by application traffic management device 130. For didactic purposes, application traffic management device 130 is configured to manage network traffic traversing a network path. The above-identified patents and patent applications, incorporated by reference herein, disclose various functionalities and features that may be incorporated into application traffic management devices according to various implementations of the claimed embodiments. In addition, interfaces 71 and 72a are truly network interfaces, as they include the signal processing and other functionality to process electrical signals to resolve packets, and read packets into memory of a network device such as device 130. However, interface 72b is merely a connector port such that when a switch is closed, a short circuit/wire connection is created between a connector port of 71 and a connector port of 72b.

In one embodiment, first and second network interfaces 71 and 72a and third bypass network interface 72b are the network communications interfaces that receive and transmit packets over the computer network environment. In one implementation, first and second network interfaces 71, 72a and third bypass network interface 72b reside on separate network interface cards operably connected to the system bus of application traffic management device 130. In another implementation, first and second network interfaces reside on the same network interface card. In addition, the first and second network interfaces 71 and 72a and third bypass network interface 72b can be wired network interfaces, such as Ethernet (IEEE 802.3), or a synchronous optical network ("SONET") interfaces, and/or wireless network interfaces, such as IEEE 802.11, BlueTooth, satellite-based interfaces, and the like. As FIG. 2 illustrates, application traffic management device 130, in one embodiment, includes persistent memory 76, such as a hard disk drive or other suitable memory device, such writable CD, DVD, or tape drives. In other implementations, application traffic management device 130 can include additional network interfaces, beyond network interfaces 71, 72a and third bypass network interface 72b, to support additional network paths or other functionality. Furthermore, U.S. application Ser. No. 10/843,185 provides a description of the operation of various modules (according to one possible implementation of the claimed embodiments), such as network interface drivers, and data structures for receiving into memory and processing packets encountered at network interfaces 71 and 72a.

As FIG. 2 illustrates, network device application processor 75, in one implementation, includes a packet processor 92, flow control module 94, and traffic classification engine 96. Network device application processor 75, in one implementation, further comprises host database 134, flow database 135, measurement engine 140, management information base 138, and administrator interface 150. In one embodiment, the packet processor 92 is operative to process data packets, such as detecting new data flows, parsing the data packets for various attributes (such as source and destination addresses, and the like) and storing packet attributes in a buffer structure, and maintaining one or more flow variables or statistics (such as packet count, current rate, etc.) in connection with the data flows and/or the source/destination hosts. The traffic classification engine 96, as discussed more fully below, is operative to classify data flows based on one or more attributes associated with the data flows. Traffic classification engine 96, in one implementation, stores traffic classes associated with data flows encountered during operation of application traffic management device 130, as well as manually created traffic classes configured by a network administrator, in a hierarchical traffic class structure. In one implementation, flow control module 94 is operative to apply aggregate and per-flow bandwidth utilization controls to data flows traversing network paths in the inbound and/or outbound directions.

The host database 134, in one implementation, maintains one or more data flow or other metrics in association with the hosts. In one implementation, the host database, maintains, inter alia, for each IP address 1) the number of concurrent connections (Conn); 2) the current data flow rate (Curr rate); and 3) the average bits per second (bps) over a one-minute interval (1 Min avg). In addition, in one implementation, host database 134 maintains for each host address the following fields: 4) the number of new flows or connections for which the host is a client over the last minute; 5) the number of new flows or connections for which the host is a server over the last minute; and 6) the number of failed flows corresponding to a given host. In some implementations, host database 134 may also be configured to maintain: 7) the number of current or existing TCP (or other handshake-oriented protocol) connections for which the host is a client; 8) the number of current UDP (or other similar protocol) connections for which the host is a client; 9) the number of current or existing TCP (or other handshake-oriented protocol) connections for which the host is a server; and 10) the number of current UDP (or other similar protocol) connections for which the host is a server. Packet processor 92 is operative to identify new data flows, as well as the termination of existing data flows, and updates the statistics identified above as data flows traverse network device. Other functional processing modules, such as measurement engine 140, may access these values, as well as other data structures (e.g., flow database 135) to perform one or more operations on packets and/or data flows.

As discussed above, in one implementation, network device application processor 75 further comprises measurement engine 140, management information base (MIB) 138, and administrator interface 150. Management information base 138 is a database of standard and extended network objects related to the operation of application traffic management device 130. Measurement engine 140 maintains measurement and statistical data relating to operation of application traffic management device 130 to allow for monitoring of bandwidth utilization and network performance across network paths with respect to a plurality of bandwidth utilization and other network statistics on an aggregate, partition, and/or per-traffic-class level. In one implementation, measurement engine 140 tracks a variety of metrics, such as average queuing latency and average round trip time, corresponding to the partitions implemented by flow control module 94. These metrics allow flow control module 94, as discussed in more detail below, to dynamically adjust bandwidth allocations across flows and partitions to improve or manage network application performance.

Administrator interface 150 facilitates the configuration of application traffic management device 130 to adjust or change operational and configuration parameters associated with the device. For example, administrator interface 150 allows administrators to select identified traffic classes and associate them with traffic management policies, such as partitions. Administrator interface 150 also displays various views associated with a hierarchical traffic partitioning scheme and allows administrators to configure or revise the hierarchical traffic partitioning scheme. Administrator interface 150 can provide a command line interface and/or a graphical user interface accessible, for example, through a conventional browser on a client device (not shown).

Figure 3:
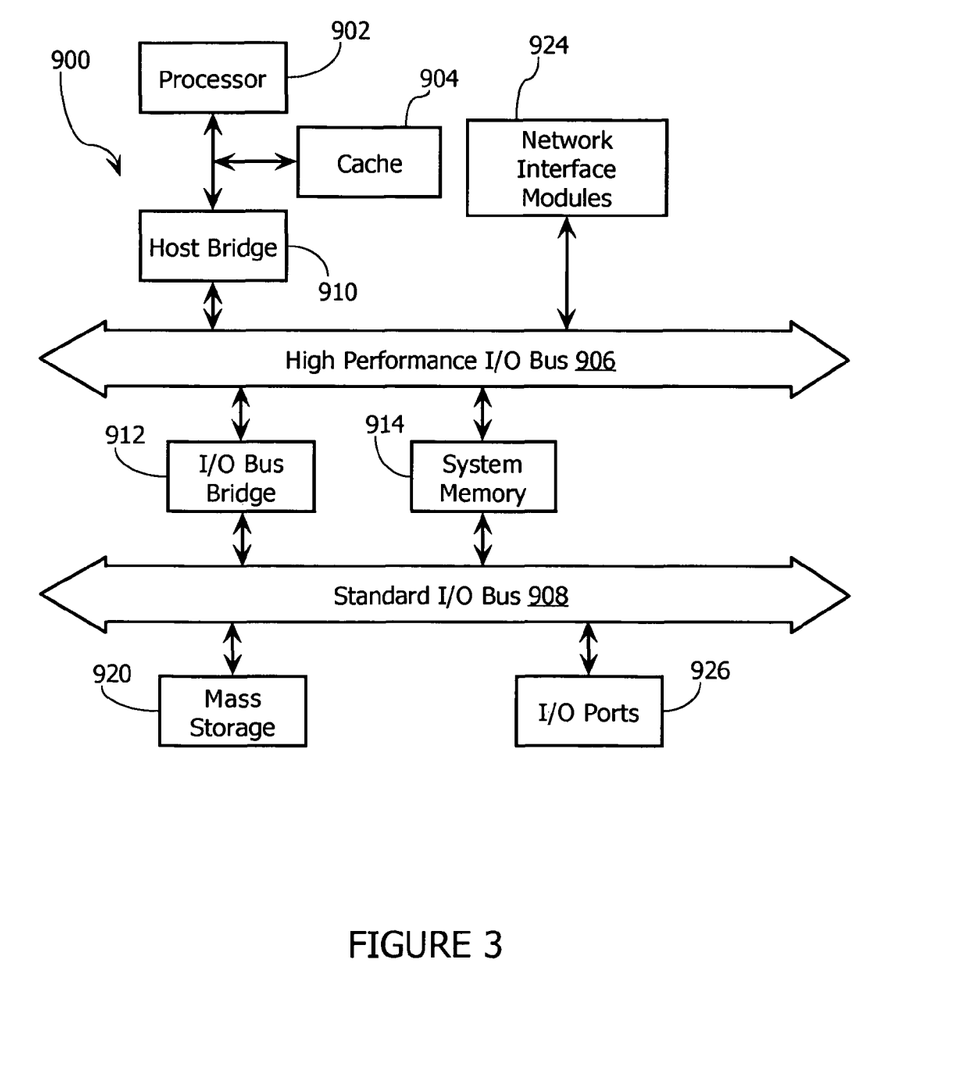
FIG. 3 is a functional block diagram illustrating the hardware components of a network application traffic management device, in accordance with an exemplary embodiment.

FIG. 3 illustrates, for didactic purposes, an exemplary computing platform, and hardware architecture, for network traffic management device 130. In one implementation, network traffic management device 130 comprises a processor 902, a system memory 914, network interface modules 924, and one or more software applications (including network device application 75 shown in FIG. 2) and drivers enabling the functions described herein.

The claimed embodiments can be implemented on a wide variety of computer system architectures. For example, FIG. 3 illustrates, hardware system 900 having components suitable for network traffic management device 130 in accordance with one implementation of the claimed embodiments. In the illustrated embodiment, the hardware system 900 includes processor 902 and a cache memory 904 coupled to each other as shown. Additionally, the hardware system 900 includes a high performance input/output (I/O) bus 906 and a standard I/O bus 908. Host bridge 910 couples processor 902 to high performance I/O bus 906, whereas I/O bus bridge 912 couples the two buses 906 and 908 to each other. Coupled to bus 906 are network interface modules 924, and system memory 914. The hardware system may further include video memory (not shown) and a display device coupled to the video memory. Coupled to bus 908 are mass storage 920 and I/O ports 926. The hardware system may optionally include a keyboard and pointing device (not shown) coupled to bus 908. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of computer hardware system 900 perform their conventional functions known in the art. In particular, network interface modules 924 (see FIG. 4, below) are used to provide communication between system 900 and any of a wide range of networks, such as an Ethernet (e.g., IEEE 802.3) network, etc. Mass storage 920 is used to provide permanent storage for the data and programming instructions to perform the above described functions implemented in the system controller, whereas system memory 914 (e.g., DRAM) is used to provide temporary storage for the data and programming instructions when executed by processor 902. I/O ports 926 are one or more serial and/or parallel communication ports used to provide communication between additional peripheral devices, which may be coupled to hardware system 900.

Hardware system 900 may include a variety of system architectures, and various components of hardware system 900 may be rearranged. For example, cache 904 may be on-chip with processor 902. Alternatively, cache 904 and processor 902 may be packed together as a "processor module," with processor 902 being referred to as the "processor core." Furthermore, certain implementations of the claimed embodiments may not require nor include all of the above components. For example, the peripheral devices shown coupled to standard I/O bus 908 may be coupled to high performance I/O bus 906. In addition, in some implementations only a single bus may exist with the components of hardware system 900 being coupled to the single bus. Furthermore, additional components may be included in system 900, such as additional processors, storage devices, or memories.

As discussed above, in one embodiment, the operations of the network traffic management device 130 described herein are implemented as a series of software routines run by hardware system 900. These software routines comprise a plurality or series of instructions to be executed by a processor in a hardware system, such as processor 902. Initially, the series of instructions are stored on a storage device, such as mass storage 920. However, the series of instructions can be stored on any conventional storage medium, such as a diskette, CD-ROM, ROM, etc. Furthermore, the series of instructions need not be stored locally, and could be received from a remote storage device, such as a server on a network, via network/communication interface 924. The instructions are copied from the storage device, such as mass storage 920, into memory 914 and then accessed and executed by processor 902. Other implementations are possible. For example, some or all of the functionality described herein can be embodied in firmware or hardware components, such as application specific integrated circuits, and the like.

An operating system manages and controls the operation of system 900, including the input and output of data to and from software applications (not shown). The operating system provides an interface between the software applications being executed on the system and the hardware components of the system. According to one embodiment of the claimed embodiments, the operating system is the LINUX operating system. However, the claimed embodiments may be used with other conventional operating systems, such as the Windows® 95/98/NT/XP operating system, available from Microsoft Corporation of Redmond, Wash. Apple Macintosh Operating System, available from Apple Computer Inc. of Cupertino, Calif., UNIX operating systems, LINUX operating systems, and the like. Of course, other implementations are possible. For example, the functionality of network traffic management device 130 may be implemented by a plurality of server blades communicating over a backplane in a parallel, distributed processing architecture.

A.1. Packet Processing

As discussed above, packet processor 92, in one implementation, is operative to detect new data flows, instantiate data structures associated with the flows and parse packets to identify packet attributes, such as source and destination addresses, port numbers, etc., and populate one or more fields in the data structures. The U.S. Patents and patent applications identified above discuss the operation of packet processors that can be incorporated into embodiments of the claimed embodiments. In one embodiment, when packet processor 92 encounters a new data flow it stores the source and destination IP addresses contained in the packet headers in host database 134. Packet processor 92 further constructs a control block (flow) object in flow database 135 including attributes characterizing a specific flow between two end systems, such as source and destination addresses, port numbers, etc. Other flow attributes in the flow object may include application specific attributes gleaned from layers above the TCP layer, such as codec identifiers for Voice over IP calls, Citrix database identifiers, and the like. Packet processor 92 also stores meta information relating to the received packets in a packet buffer—a memory space, typically in dynamic random access memory (DRAM), reserved for packets traversing application traffic management device 130. In one embodiment, the packets are stored in the packet buffer with a wrapper including various information fields, such as the time the packet was received, the packet flow direction (inbound or outbound), and a pointer to the flow object corresponding to the flow of which the packet is a part.

In typical network deployments, the majority of data flows are generally TCP or UDP flows. However, any suitable transport layer flow can be recognized and detected. As discussed more fully below, in one embodiment, flows are identified based on the following flow attributes: 1) source IP address, 2) destination IP address, 3) source port number, 4) destination port number, and 5) protocol (derived from the "protocol" field in IPv4 headers, and the "NextHeader" field in IPv6 headers). One skilled in the art will recognize that flows can be identified in relation to a variety of attributes and combinations of attributes. In addition, methods for determining new data flows and assigning packets to existing data flows are well known in the art and also depend on the particular transport layer protocol employed. For a TCP flow, for example, packet processor 92 can determine a new data flow by detecting the packets associated with the initial handshake, such as the SYN, SYN/ACK, and/or ACK packets. However, a new data flow, depending on the network protocol associated with the flow, can simply be a data flow for which there is no corresponding flow object. For example, with UDP and GRE flows (where there is no explicit connection or handshake mechanism, such as SYN packets), a new flow is recognized by associating the source and destination addresses and port numbers to the flow and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 2 minutes). If the difference between the time of the last packet and the time of the current packet is greater than the threshold, the current packet is deemed part of a new flow. In another implementation, a background and/or separate process can periodically compare the last packet times associated with a flow to a threshold period of time and deem the flow terminated if the last packet time is beyond the threshold period of time. The termination of TCP connections is typically detected by identifying FIN packets; however, the timeout mechanisms discussed above can be used in situations where a FIN packet is not detected.

In one embodiment, a control block (flow) object contains a flow specification object including such attributes as pointers to the "inside" and "outside" IP addresses in host database 134, as well as other flow specification parameters, such as inside and outside port numbers, service type (see below), protocol type and other parameters characterizing the data flow. In one embodiment, such parameters can include information gleaned from examination of data within layers 2 through 7 of the OSI reference model. U.S. Pat. No. 6,046,980 and U.S. Pat. No. 6,591,299, as well as others incorporated by reference herein, disclose classification of data flows for use in a packet-based communications environment. As discussed above, in one embodiment, a flow specification object includes an "inside" and "outside" address relative to application traffic management device 130. For a TCP/IP packet, packet processor 92 can compute the inside and outside addresses based on the source and destination network addresses of the packet and the direction of the packet flow. Still further, packet processor 92 can also identify which host is the client and which host is the server for a given data flow and store this information in the flow specification or flow object. The identification of a server or client in a given transaction generally depends on the network protocols employed by the hosts. For example, in TCP flows, a client typically starts a transaction by transmitting a SYN packet to initiate a TCP connection. Application traffic management device 130 can detect the SYN packet and note the source network address of the packet as the client host, and the destination address as the server host. One of ordinary skill in the art will recognize how to identify clients and servers in connection with other networking protocols.

In one embodiment, packet processor 92 creates and stores flow objects corresponding to data flows in flow database 135. In one embodiment, flow object attributes include a pointer to a corresponding flow specification object, as well as other flow state parameters, such as TCP connection status, timing of last packets in the inbound and outbound directions, current observed running rate, apparent round trip time, packet count, etc. Flow object attributes further include at least one traffic class identifier (or pointer(s) thereto) associated with the data flow, as well as policy parameters (or pointers thereto) corresponding to the identified traffic class. In one embodiment, flow objects further include a list of traffic classes for which measurement data (maintained by measurement engine 140) associated with the data flow should be logged. In one embodiment, to facilitate association of an existing flow object to subsequent packets associated with a data flow or connection, flow database 135 further maintains a control block hash table including a key comprising a hashed value computed from a string comprising the inside IP address, outside IP address, inside port number, outside port number, and protocol type (e.g., TCP, UDP, etc.) associated with a pointer to the corresponding flow object. According to this embodiment, to identify whether a flow object exists for a given data flow, packet processor 92 hashes the values identified above and scans the hash table for a matching entry. If one exists, packet processor 92 associates the pointer to the corresponding flow object with the packets in the data flow.

A.2. Traffic Classification Engine

As discussed above, traffic classification engine 96, in one implementation, is operative to classify data flows into one of a plurality of traffic classes. Traffic classification engine 96, in one implementation, comprises a plurality of service type identification modules, each of which correspond to a set of service types. Each service type identification module analyzes one or more packets in a given data flow to attempt to identify a service type corresponding to the flow. A service type, in one implementation, can be a network protocol, a service, or a network-application. For example, one service type identification module can correspond to a network application, such as Citrix®, while another service type identification module can be dedicated to detecting Oracle® or PostgreSQL database traffic. Still other service type identification modules can classify HTTP flows, FTP flows, ICMP flows, RTP flows, NNTP, SMTP, SSL, DICOM and the like. In one implementation, traffic classification engine 96 passes pointers to received packets to each service type identification module, which then inspect the packets stored in the buffer memory. In one implementation, each service type identification module has an associated packet count threshold (in the aggregate, packets from server to client, or client to server) after which it no longer attempts to classify a data flow. In one implementation, the packet count threshold will vary across the service type identification modules. For example, a service type identification module dedicated to classifying Citrix® traffic may be able to classify a data flow with certainty after three packets. In many instances, application traffic management device 130 may have to encounter more than one packet corresponding to a data flow in order to finally classify the data flow. For example, the initial TCP handshake packets may only reveal IP address, port numbers and protocol identifiers. While this information may be sufficient to identify HTTP traffic, for example, additional packets (such as data packets) may reveal a more specific network application, such as an accounting application or peer-to-peer file sharing application, that utilizes HTTP. Accordingly, in one implementation, each service type identification module responds to receiving a pointer to a packet by 1) reporting a matching service type identifier and the desire to inspect more packets in the flow (to possibly identify a more specific service type identifier); 2) reporting a matching service type and no interest in inspecting subsequent packets in the flow; 3) reporting no matching service type identifier and the desire to inspect more packets in the flow; and 4) reporting no matching service type and no interest in inspecting subsequent packets in the flow.

To facilitate identification of service types (e.g., FTP, HTTP, etc.), traffic classification engine 96, in one embodiment, is supported by one to a plurality of service identification tables in a relational database that allow for identification of a particular service type (e.g., application, protocol, etc.) based on the attributes of a particular data flow. Of course, other suitable data structures can be used to support the identification of service types, such as a set of hard-coded instructions, an XML file, and the like. In one embodiment, a services table including the following fields: 1) service ID, 2) service aggregate (if any), 3) name of service, 4) service attributes (e.g., port number, outside IP address, etc.), and a 5) default bandwidth management policy. A service aggregate encompasses a combination of individual services (each including different matching criteria, such as different port numbers, etc.) corresponding to the service aggregate. When application traffic management device 130 encounters a new flow, the service type identification modules of traffic classification engine 96 analyze the data flow against the service attributes in their respective services tables to identify a service ID corresponding to the flow. In one embodiment, traffic classification engine 96 may identify more than one service ID associated with the flow. In this instance, traffic classification engine 96 associates the more/most specific service ID to the flow. For example, network traffic associated with a peer-to-peer file sharing service may be identified according to a network protocol, such as TCP or HTTP traffic, as well as higher level, application-specific traffic types such as the actual file sharing application itself (e.g., Napster, Morpheus, etc.). In this instance, traffic classification engine 96 associates the flow with the most specific service ID. As a further example, an RTSP application data flow can be further classified to RTSP-Broadcast or RTSP-REALNET-TCP in the middle of the flow after a particular signature in the packets is encountered. In one implementation, traffic classification engine 96 writes the identified service type ID into the control block (flow) object corresponding to the data flow.

As discussed more fully below, service type identification, in one implementation, is a preliminary operation to the classification of a data flow according to the traffic classification scheme configured by a network administrator. For example, a traffic class maintained by traffic classification engine 96 may be configured to include matching rules based on the service IDs in the services table. For example, a matching rule directed to HTTP traffic may simply refer to the corresponding service ID, as opposed to the individual attributes that the service type identification modules uses to initially identify the service. This implementation allows for a variety of traffic classification configurations, such as the configuration of child traffic classes that further classify HTTP traffic on the basis of a network application, a range of IP addresses, and the like. Still further, the service type identifiers can correspond to a specific network application (e.g., Napster, Citrix, NetIQ, Oracle, Skype, etc.) and more generally to network protocols or services, such as IP, TCP, HTTP, SOAP, XML, UDP, FTP, SMTP, etc.

A traffic class comprises a set of matching rules or attributes allowing for logical grouping of data flows that share the same characteristic or set of characteristics. In one implementation, the matching rules can correspond to the service type identifiers discussed above, as well as other data flow attributes, such as the network interface on which the packets are received by application traffic management device 130, whether the server is the inside or outside host (see above), non-standard and standard port numbers, host IP address or subnet, MAC address, application-specific strings, diffserv codes, MPLS tags, VLAN tags, and the like. In one embodiment, each traffic class has at least one attribute defining the criterion (ia) used for identifying a specific traffic class. In one implementation, the attributes defining a given traffic class can be based on explicitly presented attributes of one or more packets corresponding to a data flow (as discussed above), or be based on behavioral attributes of the end systems associated with the flow. The U.S. patent applications identified above disclose various network traffic classification mechanisms that can be incorporated into embodiments of the claimed embodiments. For example, a traffic class can be defined by configuring an attribute defining a particular IP address or subnet. Of course, a particular traffic class can be defined in relation to a plurality of related and/or orthogonal data flow attributes. U.S. Pat. Nos. 6,412,000 and 6,591,299, and U.S. patent application Ser. No. 10/039,992 describe some of the data flow attributes that may be used to define a traffic class, as well as the use of hierarchical classification structures to associate traffic classes to data flows. In one embodiment, application traffic management device 130 includes functionality allowing for classification of network traffic based on information from layers 2 to 7 of the OSI reference model. Application traffic management device 130 can be configured to include matching rules that define a plurality of network applications commonly found in enterprise networks, such as database applications, Citrix® flows, ERP applications, and the like. As discussed below, the matching rules or attributes for a traffic class may be based on various types of node behavior, such as the number of concurrent connections of the inside or outside host.

In one embodiment, application traffic management device 130 is configured to include a predefined set of traffic classes based upon a knowledge base gleaned from observation of common or known traffic types on current networks. Application traffic management device 130, in one embodiment, also allows an administrator to manually create a traffic class by specifying a set of matching attributes. As discussed above, administrator interface 150, in one embodiment, allows for selection of a traffic class and the configuration of traffic management policies for the selected traffic class. Administrator interface 150, in one embodiment, also allows for the selection and arrangement of traffic classes into hierarchical reference trees. In one embodiment, traffic classification engine 96 also stores traffic classes added by the traffic discovery module. Furthermore, as discussed below, application traffic management device 130 may also include traffic class discovery functionality that automatically adds traffic classes to traffic classification engine 96 in response to data flows traversing the device. Automatic network traffic discovery and classification (see below) is disclosed in U.S. Pat. Nos. 6,412,000, 6,457,051, and 6,591,299, which are incorporated herein by reference.

Traffic classification engine 96, in one implementation, stores traffic classes associated with data flows that traverse network paths of which device 130 lies between. Traffic classification engine 96, in one embodiment, stores the traffic classes and corresponding data (e.g., matching rules, policies, partition pointers, etc.) related to each traffic class in a hierarchical tree. This tree is organized to show parent-child relationships—that is, a particular traffic class may have one or more subordinate child traffic classes with more specific characteristics (matching rules) than the parent class. For example, at one level a traffic class may be configured to define a particular user group or subnet, while additional child traffic classes can be configured to identify specific application traffic associated with the user group or subnet. U.S. application Ser. No. 10/334,467, as well as other patents and patent applications identified above, disclose how traffic classification engine 96 traverses the hierarchical tree to match a data flow to a leaf traffic class node.

In one embodiment, the root traffic classifications are "/Inbound" and "/Outbound" data flows. Any data flow not explicitly classified is classified as "/Inbound/Default" or "/Outbound/Default". In other implementations, the concept of "inbound" and "outbound" is replaced by a set of policies corresponding to pairs of network interfaces, such as interfaces 71 and 72a, and the direction of packet traffic. For example, packets flowing from network interface 71 to network interface 72a (and vice versa) can be classified on that basis to eliminate any potential restrictions on classification of data flows in different network topologies. A "LocalHost" traffic class, in one implementation, corresponds to packets and data flows destined for application traffic management device 130, such as requests for stored measurement data, traffic class mapping packets, or device configuration changes. In one embodiment, traffic classification engine 96 attempts to match to a leaf traffic class node before proceeding to remaining traffic class nodes in the hierarchical configuration. If a traffic class is found, the traffic classification engine 96 stops the instant search process and returns the identified traffic classification. Of course, one skilled in the art will recognize that alternative ways for traversing the hierarchical traffic class configuration can be implemented. For example, traffic classification engine 96 may be configured to traverse all traffic class nodes at a given level before proceeding to lower levels of the traffic classification tree.

In one embodiment, administrator interface 150 displays the traffic class tree and allows for selection of a traffic class and the configuration of policy (such as a partition) for that traffic class. Application traffic management device 130 further allows an administrator to manually create a traffic class by specifying a set of matching rules and also automatically creates traffic classes by monitoring network traffic across network paths that device 130 is installed between and classifying data flows according to a set of criteria to create matching rules for each traffic type. In one embodiment, each traffic class node includes a traffic class identifier; at least one traffic class (matching) attribute; at least one policy parameter (e.g., a partition identifier, etc.), a pointer field reserved for pointers to one to a plurality of child traffic classes.

A.3. Flow Control Module

As discussed above, flow control module 94 enforces bandwidth utilization controls (and, in some embodiments, other policies) on data flows. A bandwidth utilization control for a particular data flow can comprise an aggregate control bandwidth utilization control (e.g., a partition), a per-flow bandwidth utilization control (e.g., a rate policy), or a combination of the two. Flow control module 132 may incorporate any or a subset of the TCP rate control functionality described in the cross-referenced U.S. patents and/or patent applications set forth above for controlling the rate of data flows. Application traffic management device 130, however, can also be configured to implement a variety of different policy types, such as security policies, admission control policies, marking (diffserv, VLAN, etc.) policies, redirection policies, caching policies, transcoding policies, and network address translation (NAT) policies. Of course, one of ordinary skill in the art will recognize that other policy types can be incorporated into the claimed embodiments.

Partitions can be arranged in a hierarchy—that is, partitions can contain partitions. For example, the bandwidth, or a portion of the bandwidth, available under a parent partition can be allocated among multiple child partitions. In one embodiment, at the highest level, a partition exists for all available outbound bandwidth (i.e., root outbound partition), while another partition exists for all available inbound bandwidth (i.e., root inbound partition) across the particular network path. These partitions are then sub-dividable to form a hierarchical tree. For example, an enterprise employing static partitions may define a static partition for an Oracle® software application, and sub-divide this parent partition into a large burstable child partition for its human resources department and a smaller burstable child partition for the accounting department.

In addition, flow control module 94, in some implementations, can optionally apply per-flow policies on data flows traversing network paths. However, configuration and implementation of per-flow rate policies occurs in connection with a corresponding partition. Per-flow policies may include minimum and maximum bandwidth limits applied on a per-flow basis within a given partition. In one implementation, flow control module 94 includes a partitioning module operative to enforce aggregate bandwidth utilization controls (e.g., partitions), and a per-flow rate control module operative to apply per-flow rate controls on data flows. In addition, in one implementation, flow control module 94 implements the TCP Rate Control technologies disclosed in U.S. Pat. No. 6,038, 216 to control the rate at which transmitters send data and therefore the amount of data that is queued in buffers at network traffic management device 130.

A.3.a. Partition Configuration

According to one implementation of the claimed embodiments, the user configuration interface implemented by application traffic management device 130 allows the user to configure a bandwidth partition scheme. In one implementation, the partition configuration can directly map, on a one-to-one basis, to the hierarchical traffic class configuration used to classify network traffic, where all traffic gets matched to a leaf node in the traffic class tree. However, in other implementations, the partition configuration may be orthogonal to the traffic class configuration. Similar to the traffic class tree, the root partition node represents the capacity of a network path in either the inbound or outbound directions. In one implementation, separate partition configurations and controls can be maintained for data flows traveling in the inbound or outbound directions. In other implementations, a single partition configuration can be applied to both inbound and outbound data flows.

Once a partition is established, in one implementation, a user can configure a bandwidth allocation for the partition. For example, a partition can be configured to protect a network traffic class by guaranteeing a defined amount of bandwidth and/or limit a network traffic class by placing a cap on the amount of bandwidth a traffic class can consume. Such partitions can be fixed or "burstable." A fixed partition allows a traffic class to use in the aggregate a defined amount of bandwidth. A fixed partition not only ensures that a specific amount of bandwidth will be available, but it also limits data flows associated with that traffic class to that same level. A burstable partition allows an aggregate traffic class to use a defined amount of bandwidth, and also allows that traffic class to access additional unused bandwidth, if needed. A cap may be placed on a burstable partition, allowing the traffic class to access up to a maximum amount of bandwidth, or the burstable partition may be allowed to potentially consume all available bandwidth across a network path. Given the nature of partitions according to the implementations discussed above, the bandwidth allocated to a partition at any given time can vary as data flows traverse application traffic management device 130, and one or more partitions are allowed to consume additional bandwidth.

After the user has completed a configuration, administrator interface 150, in one implementation, processes the configuration to create an aggregate bandwidth allocation scheme that includes partitions, and per-flow rate policies, based on the received configuration. For example, partition queues are created for each partition, and weighted, fair share bandwidth allocations are computed for the partitions, as discussed in more detail below. In addition, in one implementation, each active data flow within a given partition is also guaranteed a fair share of the bandwidth allocated to the partition. As discussed above, the allocation for each partition is generally stable, unless there are configuration changes or bursting is allowed. However, the fair share allocation for each flow changes dynamically based on the number of active flows in the partition. In addition, the actual bandwidth allocated to a given partition at a given point in time may change dynamically in response to network traffic demands.

A.4. Network Device Failure Detection in Wide Area Network Topologies

Now that an exemplary framework for practicing the claimed embodiments has been described, those claimed embodiments will now be discussed beginning with FIG. 4 which is a functional block diagram illustrating a schematic 400 for implementing a network traffic bypass in a network device 402, in accordance with an exemplary embodiment. Included in schematic 400 is an incoming connector port 404, an outgoing communication port 406, a bypass communication port 408, transformers (410, 412), Ethernet controllers 418, switches (420, 422), a jumper section 424 and various PCB circuit traces (426, 428, 430, 432, 434, 436, 438, 440, 442). When device 402 is properly functioning, switch 420 connects trace 426 and trace 428 and incoming connector port 404 at point 420a. Similarly, when device 402 is functioning, switch 422 connects trace 434 to trace 436 and outgoing port 406 at point 422a. In this configuration, incoming electrical signals bearing network traffic packets enter device 402 at incoming connector port 404 and travel through in the following path: trace 426, switch 420, trace 428, transformer 410, trace 430, and Ethernet controllers 418 where the packets are processed. Similarly, electrical signals of outgoing packets follow the path: trace 432, transformer 412, trace 434, switch 422, trace 436, and connector port 406.

Figure 4:
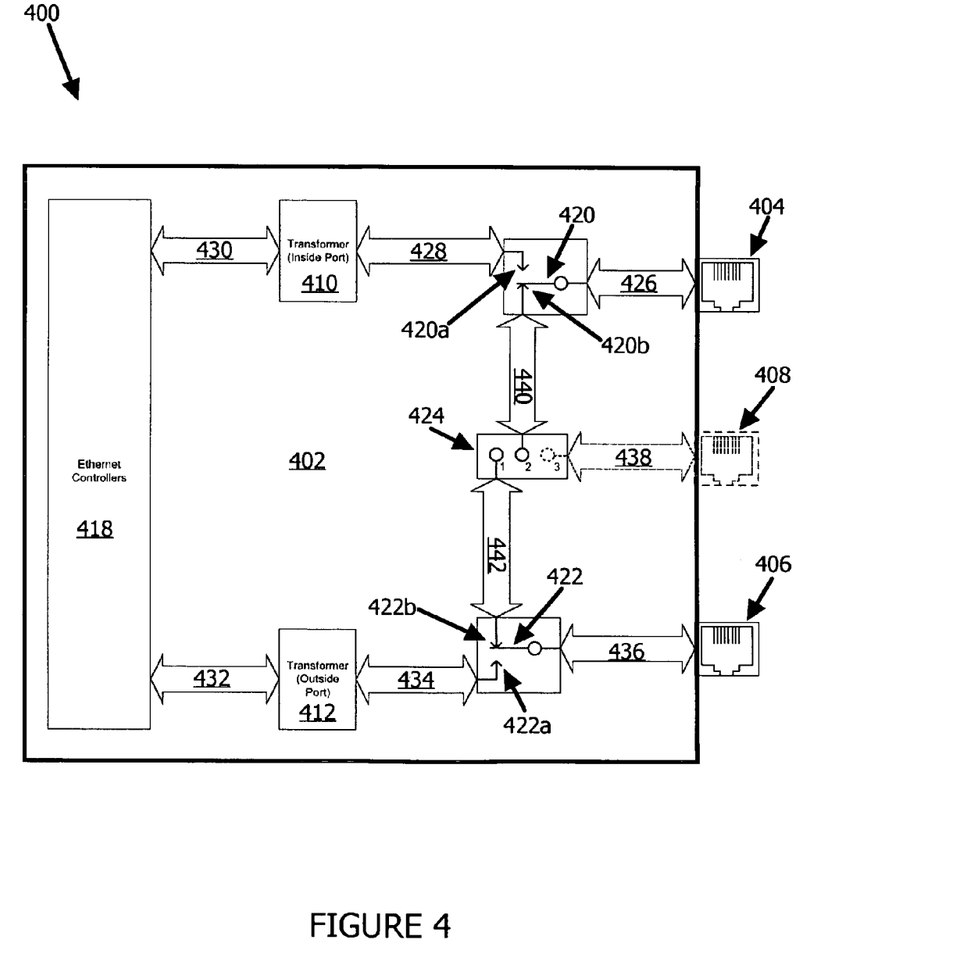
FIG. 4 is a functional block diagram illustrating a schematic for implementing a network traffic bypass in a network device, in accordance with an exemplary embodiment.

It should be noted that FIG. 4 is a fairly high-level block diagram. As such, the various traces (426, 428, 430, 432, 434, 436, 438, 440, 442) are only meant to be illustrative of an electrical connection between various components and should not necessarily be interpreted as a direct connection as other components may be interspersed along the traces.

During normal operation, a firmware or software module (not shown) of network device 130 is operative to assert a control signal, which is routed to a general purpose input-output (GPI/O) pin to maintain the above-described packet processing path. Restated, the asserted control signal causes switches 420 and 422 to be connected to points 420a and 422a, respectively, which forwards packet-bearing signals to the packet processing path of the network device. When a failure condition occurs, for example a software or hardware failure, control signals will no longer be asserted and switches 420 and 422 will move to points 420b and 422b, respectively. By default (e.g., when no control signal is asserted), the switches 420, 422 and jumper connection 424 create a "fail-to-wire" short circuit between interface connectors 404 and 408. Accordingly, the control signal is not asserted when the device is powered off, being powered off, or powered on, but booting and not yet initialized. In addition, the control signal may be de-asserted in response to a system crash even though the device is still powered on. For example, a watchdog module can be employed to address system software crashes or failures. During normal operation, a timer monitored by the watchdog module is continually reset. During a system crash, however, the watchdog module times out, causing a non-maskable interrupt (NMI) to be generated. The device generates a crash log, and resets the system. During the system reset (such as a re-boot), the control signal is de-asserted resulting in the "fail-to-wire" bypass mode discussed herein. Still further, the control signal can be de-asserted and asserted based on explicit commands transmitted by the application. For example, in response to a link status error indicating a broken link (for example), the application can cause the control signal to be de-asserted during the error condition.

As previously mentioned, prior art systems merely diverted packets from a device processing section, such as section Ethernet section 418, in the event of a failure condition and incoming packets are diverted to the outgoing port with no processing taking place. For illustrative purposes only, device 402 can be configured in such a manner and that is accomplished by placing a jumper between 1 and 2 of jumper section 424. If device 402 becomes nonfunctional, switch 420 moves to point 420b and switch 422 moves to point 422b. As a result, a circuit is formed that bypasses Ethernet section 418. Specifically, network traffic packets entering device 402 will go along the following path: incoming connector port 404, trace 426, switch 420, trace 440, a jumper connected to points 1 and 2 of jumper section 424, trace 442, switch 422, trace 436 and out through port 406. This particular implementation could perhaps be utilized when a backup network device is deployed.

In a one implementation, a jumper is placed between points 2 and 3 of jumper section 424 in order to enable a bypass of Ethernet section 418 and outgoing port 406. In this configuration and during a failure condition, network traffic will enter the device at incoming connector port 404 and exit at port 408. More specifically, packet-bearing signals will travel along the following path: incoming connector port 404, trace 426, switch 420, trace 440, a jumper between points 2 and 3 of jumper section 424, trace 438 and out port 408. As previously mentioned, a network management protocol, such as simple network management protocol ("SNMP"), can be utilized to monitor network traffic conditions at the bypass port 408. When network traffic appears at the bypass port 408, an alert (such as an SNMP trap) can be sent to a system operator local to the device 402 or, perhaps, a system operator at a remote location such as NOC 10 of FIG. 1.

Bypass port 408 can perhaps be added into an existing network device. Alternatively, bypass port 408 could be an existing port and can be configured to serve as a bypass port. Connector port 408 may be an RJ-45 connector, an Rj-11 connector or any other suitable physical connector. In most implementations, the physical configuration of connector port 408 will match connector ports 404 and 406.

Figure 5:
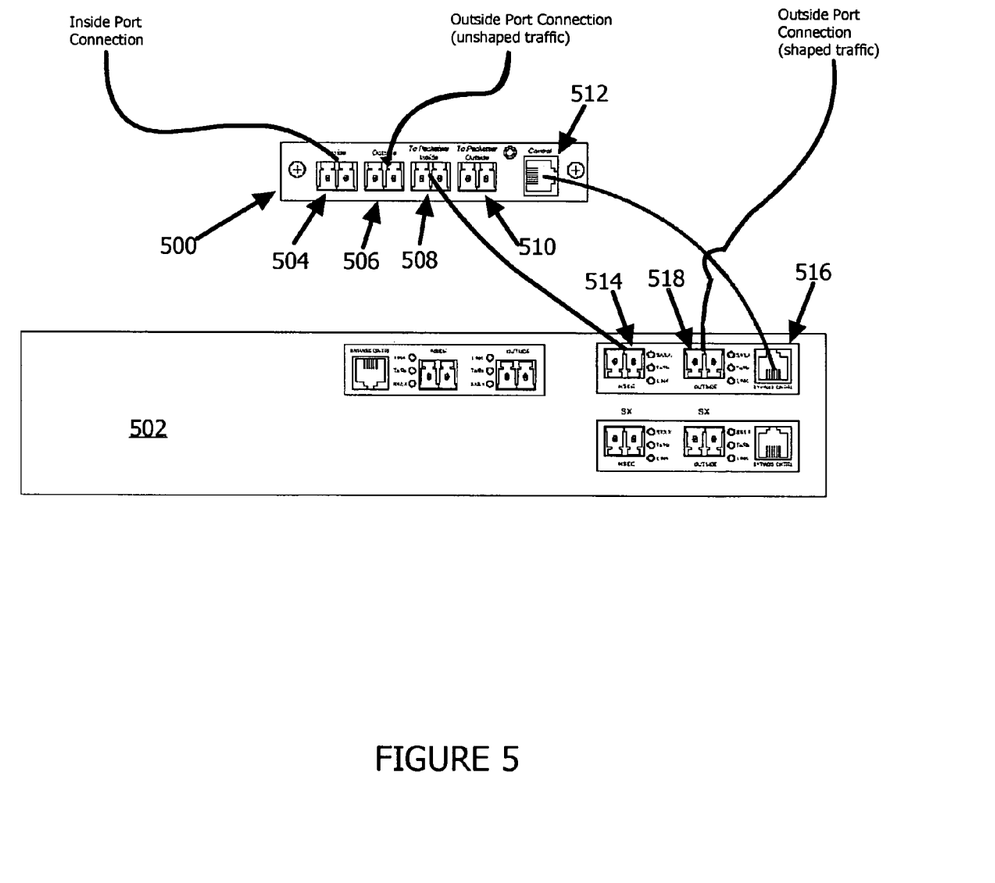
FIG. 5 illustrates connections between an optical switch module and a network device for implementing a network traffic bypass, in accordance with an exemplary embodiment.

An optical/fiber switch can also be utilized to bypass network traffic to a secondary outgoing traffic port on the optical switch. To that end, FIG. 5 illustrates connections between an optical switch module 500 and a network device 502 for implementing a network traffic bypass, in accordance with an exemplary embodiment. Optical switch module 502 is typically used as an external bypass to ensure uninterrupted network access even if a network device loses power, is in bypass mode or encounters an unlikely failure. Module 502 has spherical mirrors (not shown) that reflects optical signals to the appropriate fiber-optic connector, and power is only required to maintain the specified connectivity state. The device's default state is to bypass and a control cable, connected to a network device, signals a change to normal mode to send/receive traffic through the network device. Module 502 will typically have four fiber-optic interfaces—one for each of the network device's interfaces (inside and outside), one for a router and one for a LAN/bypass switch. When the network device is not on or is in bypass mode, the relay mirrors within module 502 are set to bridge the optical signals directly through the switch, completely bypassing the network device. If the network device is on and operating normally, it supplies power to the switch through a control cable and the relay mirrors are pivoted to send and receive the optical signals (and traffic) to and from the network device. Module 500 can be a multi-mode switch or a single-mode switch and either version is compatible with the claimed embodiments.

Module 500 includes an incoming communication port 504, a bypass/secondary communication port 506 and inside and outside communication ports (508, 510) to that typically are connected to inside and outside ports of a network device such as device 502. Module 500 additionally includes a bypass control port 512 that is typically connected a corresponding bypass control port of a network device. Device 502 is connected to module 500 between incoming ports 508 and 514 and between bypass control ports 512 and 516.

During normal operating mode for device 502, network traffic will enter port 504 of module 500, exit through port 508, enter device 502 at port 514 and processed packets exit via port 518. When a failure condition occurs at device 502, device 502 will no longer power module 500 and module 500 will bypass traffic from port 508 to port 506.

Figure 6:
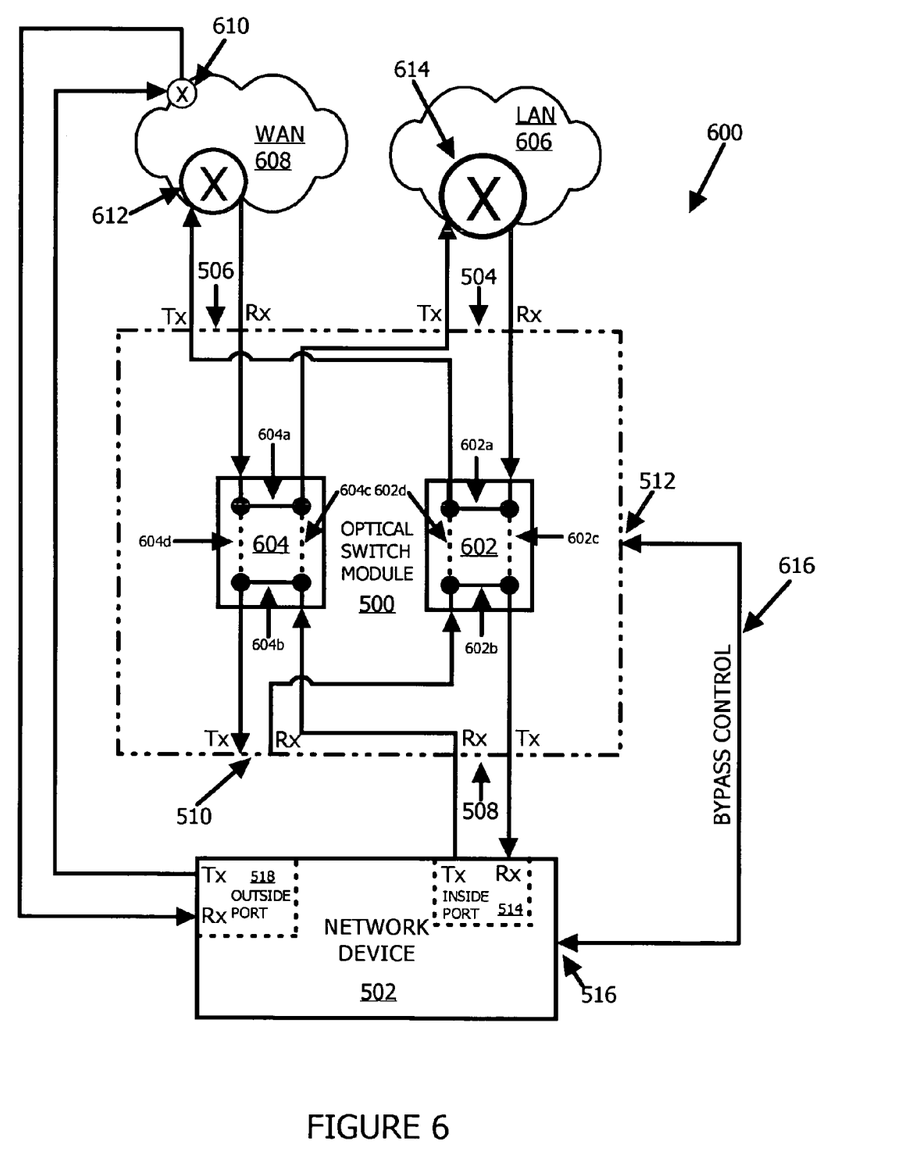
FIG. 6 is a functional block diagram further illustrating the optical switch module of FIG. 5 and connections to the network device, in accordance with a preferred embodiment.

To provide more detail, FIG. 6 is a functional block diagram further illustrating the optical switch module 500 of FIG. 5 and connections to the network device 502, in accordance with a preferred embodiment. Module 500 includes switch sub-assemblies 602 and 604 which are both controlled via the aforementioned mirrors (not shown). Solid lines (602a, 602b, 604a, 604b) indicate one path of travel for network traffic when the mirrors of module 500 are in one position and dotted lines (602c, 602d, 604c, 604d) indicate an alternate network traffic travel path when the mirrors are at a second position. Dotted lines (602c, 602d, 604c, 604d) are the default/open circuit when device 502 is functional and powering module 500. Otherwise, the solid lines (602a, 602b, 604a, 604b) are the closed/non-functional device 502 network traffic travel path.

In a normal operating mode, outgoing network traffic/packets from LAN 606 will travel along the following path: router 614, port 504, sub-assembly 602, port 508 and port 514. Outgoing traffic from device 502 destined for LAN 606 will traverse the following path: port 514, port 508, sub-assembly 604, port 504 and router 614. Traffic/packets traveling between device 502 and WAN 608 travel between port 518 of device 502 and a router 610 located at WAN 608.

If a failure condition occurs at device 502, device 502 will stop powering module 500 via a bypass control connection 616 between ports 512 and 516. As a result, module 500 will switch to a closed circuit and network traffic entering module 500 will bypass device 502. For example, network traffic leaving LAN 606 will traverse the following path: router 614, port 504, sub-assembly 602, port 506 and router 612 of WAN 608. Network traffic from WAN 608 to LAN 606 will traverse this path: router 612, port 506, sub-assembly 604, port 504 and router 614.

In one implementation, routers 610 and 612 are one router. In another implementation, device 502 and module 502 are integrated into a single device.

As previously mentioned, a network protocol, such as SNMP, can be utilized to detect when device 502 becomes non-functional. In the implementation of FIG. 6, the protocol can be set up to monitor for an appearance of network traffic traversing router 612 to and from port 506 of module 500.

Figure 7:
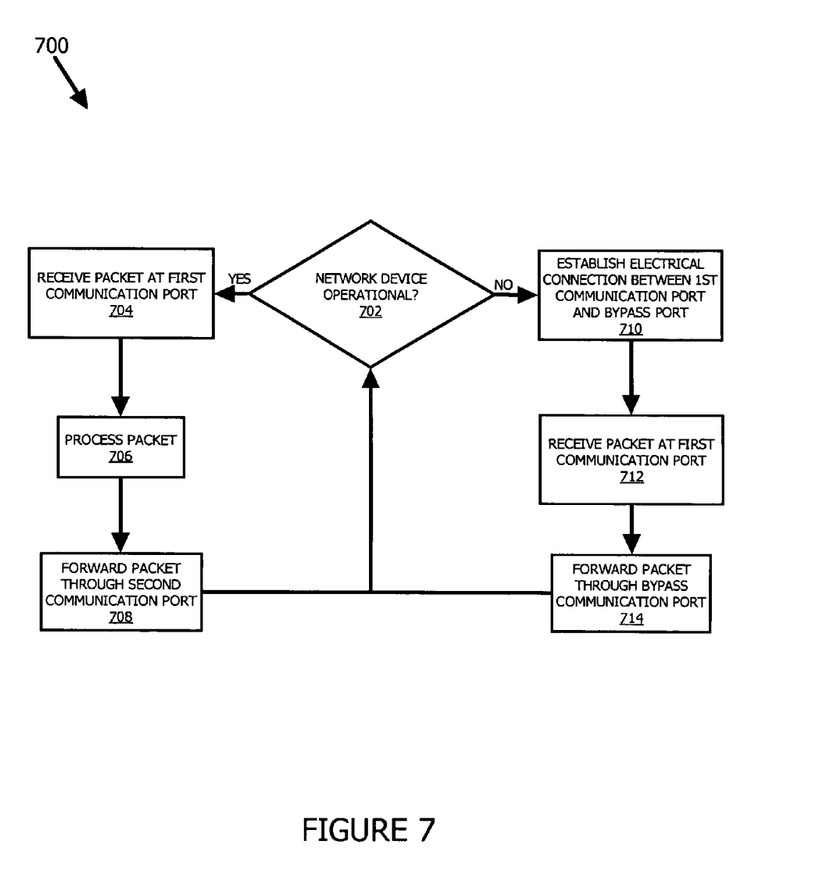
FIG. 7 is a flow chart diagram illustrating a method for bypassing network traffic from a network device when the network device becomes non-operational, in accordance with a preferred embodiment.

FIG. 7 is a flow chart diagram illustrating a process flow 700 for bypassing network traffic from a network device when the network device becomes non-operational, in accordance with a preferred embodiment. The process flow can be implemented in connection with network devices 130 and 402. During normal operation the network device will receive, process and forward a packet. If the device experiences a failure condition/becomes non-operational, an electrical connection is established between a first/incoming communication port and a bypass port, causing packet-bearing signals to bypass a processing section of the network device by traveling from the first port directly to the bypass port.

Firstly, it is determined if the network device is operational (702). If yes, the device receives a network traffic/packet at a first communication port, processes the packet and forwards the packet out of a second communication port (704, 706, 708). If the device is still functional (702), the device will receive, process and forward (704, 706, 708) additional packets. If no, an electrical connection is established between the first port and a bypass port, a packet is received at the first port and forwarded out of the bypass port (710, 712, 714). If the device is still non-operational (702), operations 710, 712 and 714 are repeated for additional packets until the device becomes operational again.

Method 700 can also be practiced on device 502 and optical switch module 500 but module 500 would instead perform operations 710, 712 and 714.

The above-described embodiments advantageously provide various methods, systems and apparatuses for bypassing a network device when the network device becomes non-operational while simultaneously providing an ability to detect the failure by funneling network traffic out of a designated port instead of the usual outgoing traffic port.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A network interface module comprising:
   first and second communication ports;
   a dedicated bypass communication port configured to bypass the first and second communication ports; and
   one or more bypass switches configured to operate in first and second configurations, the one or more bypass switches being operative to form the first configuration upon a reception of one or more control signals from a network device and being operative to form the second configuration upon a termination of the one or more control signals received from the network device, the one or more bypass switches being further operative to form a plurality of signal links, wherein one and only one of the plurality of signal links are operable for communication along the entire communication path of the respective one of the plurality of signal links at any particular time, the plurality of signal links comprising:
      a first signal link that forms a communication path between the first communication port and, a network interface controller and between the network interface controller and the second communication port, the first signal link being operable for communication along the first signal link when the one or more bypass switches are configured in the first configuration, wherein during communication along the first signal link one or more packets are transmitted through the first communication port and are processed by one or more processors upon transmission through the network interface controller before being transmitted out of the second communication port, or, one or more packets are transmitted through the second communication port and are processed by one or more processors upon transmission through the network interface controller before being transmitted out of the first communication port; and
      a second signal link that forms a direct electrical connection between the first communication port and the bypass communication port, the second signal link being operable for communication along the second signal link when the one or more bypass switches are configured in the second configuration, wherein during communication along the second signal link one or packets are transmitted directly through the first and bypass communication ports bypassing processing by the one or more processors.

2. The interface module as recited in claim 1, wherein the second port is connected to a first port of one or more routers, and the bypass port is connected to a second port of the one or more routers;
   and the one or more routers monitors activity on the second port of the one or more routers via an SNMP trap, and notifies a system operator of an error condition when packets are received on the second port of the one or more routers.

3. A network device operative to classify data flows and provide bandwidth controls to the data flows, the network device comprising:
   a memory;
   one or more processors; and
   a circuit to bypass processing of packets wherein the circuit includes:
      first and second communication ports;
      a dedicated bypass communication port configured to bypass the first and second communication ports; and
      one or more bypass switches configured to operate in first and second configurations, the one or more bypass switches being operative to form the first configuration upon a reception of one or more control signals from a network device and being operative to form the second configuration upon a termination of the one or more control signals received from the network device, the one or more bypass switches being further operative to form a plurality of signal links, wherein one and only one of the plurality of signal links are operable for communication along the entire communication path of the respective one of the plurality of signal links at any particular time, the plurality of signal links comprising:
         a first signal link that forms a communication path between the first communication port and a network interface controller and between the network interface controller and the second communication port, the first signal link being operable for communication along the first signal link when the one or more bypass switches are configured in the first configuration, wherein during communication along the first signal link one or more packets are transmitted through the first communication port and are processed by one or more of the processors within the network device upon transmission through the network interface controller before being transmitted out of the second communication port, or, one or more packets are transmitted through the second communication port and are processed by one or more of the processors within the network device upon transmission through the network interface controller before being transmitted out of the first communication port; and a second signal link that forms a direct electrical connection between the first communication port and the bypass communication port, the second signal link being operable for communication along the second signal link when the one or more bypass switches are configured in the second configuration, wherein during communication along the second signal link one or packets are transmitted directly through the first and bypass communication ports bypassing processing by the one or more processors.

4. The network device as recited in claim 3 wherein the network device is operational when the one or more bypass switches are configured to operate in the first configuration.

5. The network device as recited in claim 3, wherein the second port is connected to a first port of one or more routers, and the bypass port is connected to a second port of the one or more routers;

and the one or more routers monitors activity on the second port of the one or more routers via an SNMP trap, and notifies a system operator of an error condition when packets are received on the second port of the one or more routers.

6. A network interface module comprising:

first and second communication ports;

a dedicated bypass communication port configured to bypass the first and second communication ports;

a jumper; and one or more bypass switches configured to operate in first and second configurations and operative to form the first configuration upon a reception of one or more control signals from a network device and being operative to form the second configuration upon a termination of the one or more control signals received from the network device;

wherein the one or more bypass switches and the jumper are configured to form a plurality of signal links, wherein one and only one of the plurality of signal links are operable for communication along the entire communication path of the respective one of the plurality of signal links at any particular time; and the plurality of signal links comprises:

a first signal link forming a communication path between the first communication port and a network interface controller and between the network interface controller and the second communication port, the first signal link being operable for communication along the first signal link when the one or more bypass switches are configured in the first configuration, wherein during communication along the first signal link one or more packets are transmitted through the first communication port and are processed by one or more processors upon transmission through the network interface controller before being transmitted out of the second communication port, or, one or more packets are transmitted through the second communication port and are processed by one or more processors upon transmission through the network interface controller before being transmitted out of the first communication port;

a second signal link that forms a direct electrical connection between the first communication port and the dedicated bypass communication port, the second signal link being operable for communication along the second signal link when the one or more bypass switches are configured in the second configuration and when the jumper is engaged, wherein during communication along the second signal link one or packets are transmitted directly through the first and dedicated bypass communication ports bypassing processing by the one or more processors; and a third signal link that forms a direct electrical connection between the first communication port and the second communication port, the third signal link being operable for communication along the third signal link when the one or more bypass switches are configured in the second configuration and when the jumper is unengaged, wherein during communication along the third signal link one or packets are transmitted directly through the first and second communication ports bypassing processing by the one or more processors.

* * * * *